M. MURPHY.
SAFETY CONNECTING ROD FOR AUTOMATIC STOKERS.
APPLICATION FILED JAN. 20, 1921.

1,384,270. Patented July 12, 1921.

M. Murphy
Inventor

By (signature)
Attorney

UNITED STATES PATENT OFFICE.

MICHAEL MURPHY, OF YOUNGSTOWN, OHIO.

SAFETY CONNECTING-ROD FOR AUTOMATIC STOKERS.

1,384,270.          Specification of Letters Patent.     Patented July 12, 1921.

Application filed January 20, 1921. Serial No. 438,697.

*To all whom it may concern:*

Be it known that I, MICHAEL MURPHY, citizen of the United States of America, residing at Youngstown, in the county of Mahoning and State of Ohio, have invented certain new and useful Improvements in Safety Connecting-Rods for Automatic Stokers, of which the following is a specification.

This invention relates to safety connecting rods for automatic stokers.

The principal object is to provide a safety device consisting of a sleeve carrying a connecting rod, said connecting rod connects a driving means and a plunger, said plunger being used to force coal or other fuel into fire box.

Another object is to provide a soft steel shearing pin which passes through the outer end of the sleeve and the connecting rod. Should the plunger come in contact with some foreign substance such as a stone, brick or any hard and resisting matter, the soft pin is sheared and the action of this plunger is stopped without damage to the stoker. The connecting rod now slides within the sleeve doing no damage. When the foreign substance causing the shearing of the shearing pin has been removed and a new shearing pin put in the plunger again functions.

The drawing illustrates a preferred embodiment of the invention. However, it is understood that in adapting the same to meeting different conditions, various changes in the form, and minor details of construction, may be resorted to without departing from the nature of the invention, as claimed and set forth in the drawings:

Figure 1:
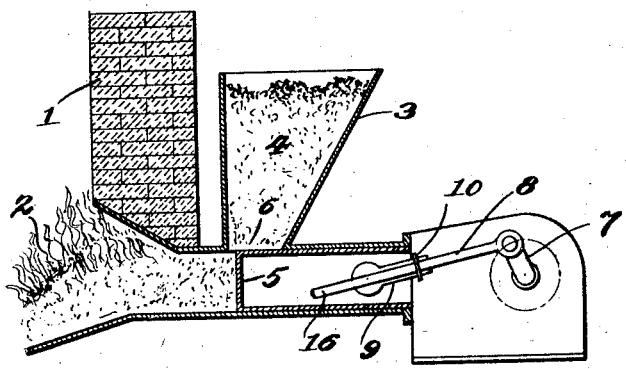
Figure 1 is a cross section through a retort showing the operation of the safety connecting rod and parts.

By referring to Fig. 1 it will be seen that 1 represents a furnace wall and 2 the fire within the furnace. Near the outer side of the furnace wall 1 is an ordinary fuel hopper 3, while 4 represents the fuel. A plunger 5 is caused to slide back and forth underneath the opening 6 of the fuel hopper 3 by means of a crank 7 which carries a safety connecting rod 8, this safety connecting rod 8 is secured within a sleeve 9 by means of a soft steel shearing pin 10.

Figure 2:
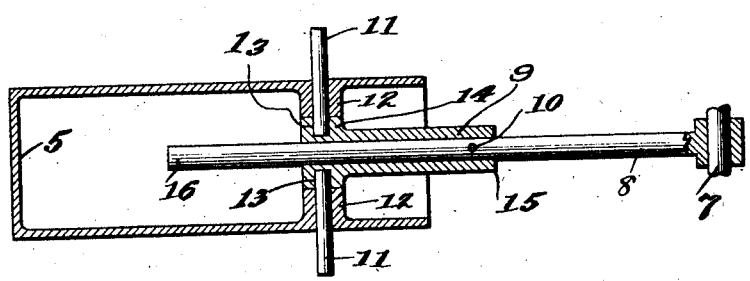
Fig. 2 is a cross section of the plunger and sleeve with safety connecting rod and securing means.

By referring to Fig. 2 it will be seen that this sleeve 9 is secured to the plunger 5 by means of rods 11 which pass through the wall of the plunger 5 and an inner flange 12 and are seated in the holes 13 formed in the enlarged end 14 of the sleeve 9, thereby pivotally connecting the sleeve 9 to the plunger 5.

By having the safety connecting rod 8 keyed to the sleeve 9 near the end 15 of the sleeve 9 it is an easy matter to put in a new soft steel shearing pin.

It will be seen that the end 16 of the safety connecting rod extends through the entire sleeve 9 and on into the plunger far enough to allow the sleeve to carry said safety connecting rod after the soft steel shearing pin has been sheared; no matter at what point in the slide of the plunger 5 the shearing might take place.

What I claim is:

In a device of the class described, a safety connecting rod, one end of the same being connected to a crank, the other end extending through a sleeve, a soft steel shearing pin passing through said sleeve and connecting rod, the said sleeve having an enlarged end provided with two holes, a plunger provided with an inner flange and provided with two holes through the outer walls of said plunger and extending through said inner flange, two rods passing through said holes and seated in the two holes formed in enlarged end of the sleeve, substantially as described for the purpose set forth.

In testimony whereof I affix my signature.

MICHAEL MURPHY.

Witnesses:
C. A. HARPMAN,
JOHN R. MEYER.